United States Patent
Dolgov et al.

(10) Patent No.: US 12,339,661 B2
(45) Date of Patent: Jun. 24, 2025

(54) AERIAL RIDE QUALITY IMPROVEMENT SYSTEM USING FEEDBACK

(71) Applicant: Joby Aero, Inc., Santa Cruz, CA (US)

(72) Inventors: Igor Dolgov, San Mateo, CA (US); Ian Andreas Villa, San Francisco, CA (US)

(73) Assignee: Joby Aero, Inc., Santa Cruz, CA (US)

(*) Notice: Subject to any disclaimer, the term of this patent is extended or adjusted under 35 U.S.C. 154(b) by 534 days.

(21) Appl. No.: 16/949,623

(22) Filed: Nov. 6, 2020

(65) Prior Publication Data

US 2021/0132611 A1    May 6, 2021

Related U.S. Application Data

(60) Provisional application No. 62/931,509, filed on Nov. 6, 2019.

(51) Int. Cl.
*G05D 1/00* (2024.01)
*G06Q 50/40* (2024.01)

(52) U.S. Cl.
CPC .......... *G05D 1/0202* (2013.01); *G06Q 50/40* (2024.01); *G05D 1/0088* (2013.01)

(58) Field of Classification Search
CPC ............... G05D 1/0202; G05D 1/0088; G05D 2201/0212; G06Q 50/30
USPC ........................................................ 244/76
See application file for complete search history.

(56) References Cited

U.S. PATENT DOCUMENTS

| | | |
|---|---|---|
| 3,035,789 A | 5/1962 | Young |
| 4,022,405 A | 5/1977 | Peterson |
| 5,823,468 A | 10/1998 | Bothe |
| 5,839,691 A | 11/1998 | Lariviere |
| 5,842,667 A | 12/1998 | Jones |
| 6,343,127 B1 | 1/2002 | Billoud |
| 6,892,980 B2 | 5/2005 | Kawai |

(Continued)

FOREIGN PATENT DOCUMENTS

| | | |
|---|---|---|
| EP | 0945841 A1 | 9/1999 |
| EP | 2698749 A1 | 2/2014 |

(Continued)

OTHER PUBLICATIONS

"International Application Serial No. PCT US2020 070756, International Search Report mailed Feb. 19, 2021", 4 pgs.

(Continued)

*Primary Examiner* — Hung Q Nguyen
*Assistant Examiner* — Anthony Donald Taylor, Jr.
(74) *Attorney, Agent, or Firm* — Dority & Manning, P.A.

(57) ABSTRACT

Systems and methods for improving aerial ride quality based on user feedback accessed from an aerial vehicle and devices associated with passengers are provided. A network system receives, from one or more devices associated with a passenger on an aerial vehicle, feedback data regarding a flight, whereby the feedback data is associated with an issue experienced by the passenger. The network system then identifies a root cause of the issue experienced by the passenger on the aerial vehicle. The identifying may include correlating the feedback data with other data associated with the flight. A mitigation action to mitigate the issue is determined. The network system may determine whether to trigger the mitigation action based on a corresponding threshold and can trigger the mitigation action to occur accordingly.

21 Claims, 7 Drawing Sheets

(56) References Cited

U.S. PATENT DOCUMENTS

| | | | |
|---|---|---|---|
| 8,016,226 | B1 | 9/2011 | Wood |
| 8,020,804 | B2 | 9/2011 | Yoeli |
| 8,311,686 | B2 | 11/2012 | Herkes et al. |
| 8,733,690 | B2 | 5/2014 | Bevirt et al. |
| 8,737,634 | B2 | 5/2014 | Brown et al. |
| 8,849,479 | B2 | 9/2014 | Walter |
| 9,205,930 | B2 | 12/2015 | Yanagawa |
| 9,387,928 | B1 | 7/2016 | Gentry et al. |
| 9,415,870 | B1 | 8/2016 | Beckman et al. |
| 9,422,055 | B1 | 8/2016 | Beckman et al. |
| 9,435,661 | B2 | 9/2016 | Brenner et al. |
| 9,442,496 | B1 | 9/2016 | Beckman et al. |
| 9,550,561 | B1 | 1/2017 | Beckman et al. |
| 9,663,237 | B2 | 5/2017 | Senkel et al. |
| 9,694,911 | B2 | 7/2017 | Bevirt et al. |
| 9,771,157 | B2 | 9/2017 | Gagne et al. |
| 9,786,961 | B2 | 10/2017 | Dyer et al. |
| 9,802,702 | B1 | 10/2017 | Beckman et al. |
| 9,816,529 | B2 | 11/2017 | Grissom et al. |
| 9,838,436 | B2 | 12/2017 | Michaels |
| 10,140,873 | B2 | 11/2018 | Adler et al. |
| 10,152,894 | B2 | 12/2018 | Adler et al. |
| 10,216,190 | B2 | 2/2019 | Bostick et al. |
| 10,249,200 | B1 | 4/2019 | Grenier et al. |
| 10,304,344 | B2 | 5/2019 | Moravek et al. |
| 10,330,482 | B2 | 6/2019 | Chen et al. |
| 10,501,014 | B2* | 12/2019 | Castro ............... G07C 5/0808 |
| 10,593,215 | B2 | 3/2020 | Villa |
| 10,593,217 | B2 | 3/2020 | Shannon |
| 10,752,365 | B2 | 8/2020 | Galzin |
| 10,759,537 | B2 | 9/2020 | Moore et al. |
| 10,768,201 | B2 | 9/2020 | Luo et al. |
| 10,832,581 | B2 | 11/2020 | Westervelt et al. |
| 10,836,470 | B2 | 11/2020 | Liu et al. |
| 10,913,528 | B1 | 2/2021 | Moore et al. |
| 10,948,910 | B2 | 3/2021 | Taveira et al. |
| 10,960,785 | B2 | 3/2021 | Villanueva et al. |
| 11,130,566 | B2 | 9/2021 | Mikic et al. |
| 11,145,211 | B2 | 10/2021 | Goel et al. |
| 11,238,745 | B2 | 2/2022 | Villa et al. |
| 11,295,622 | B2 | 4/2022 | Goel et al. |
| 2010/0079342 | A1 | 4/2010 | Smith et al. |
| 2014/0179535 | A1 | 6/2014 | Stückl et al. |
| 2016/0311529 | A1 | 10/2016 | Brotherton-Ratcliffe et al. |
| 2017/0197710 | A1 | 7/2017 | Ma |
| 2017/0214744 | A1* | 7/2017 | Neves ................... H04L 67/34 |
| 2017/0357914 | A1 | 12/2017 | Tulabandhula et al. |
| 2018/0018887 | A1 | 1/2018 | Sharma et al. |
| 2018/0022361 | A1* | 1/2018 | Rao ................... B60R 16/037 701/23 |
| 2018/0053425 | A1 | 2/2018 | Adler et al. |
| 2018/0061245 | A1* | 3/2018 | Adler ................... G08G 5/727 |
| 2018/0216988 | A1 | 8/2018 | Nance |
| 2018/0229723 | A1* | 8/2018 | Jiang .................. G05D 1/0257 |
| 2018/0281951 | A1 | 10/2018 | Gordon et al. |
| 2018/0286254 | A1* | 10/2018 | Westervelt .......... G08G 5/0039 |
| 2018/0308366 | A1 | 10/2018 | Goel et al. |
| 2018/0354636 | A1 | 12/2018 | Darnell et al. |
| 2019/0146508 | A1 | 5/2019 | Dean et al. |
| 2019/0221127 | A1 | 7/2019 | Shannon |
| 2019/0316849 | A1 | 10/2019 | Abrego et al. |
| 2020/0103922 | A1 | 4/2020 | Nonami et al. |
| 2020/0182637 | A1 | 6/2020 | Kumar et al. |
| 2020/0388166 | A1 | 12/2020 | Rostamzadeh et al. |

FOREIGN PATENT DOCUMENTS

| | | |
|---|---|---|
| EP | 3499634 A1 | 6/2019 |
| JP | 2010095246 A | 4/2010 |
| JP | 2013086795 A | 5/2013 |
| WO | WO 2018023556 A1 | 2/2018 |
| WO | WO 2019089677 A1 | 5/2019 |
| WO | WO 2020252024 A1 | 12/2020 |

OTHER PUBLICATIONS

"International Application Serial No. PCT US2020 070756, Written Opinion mailed Feb. 19, 2021", 6 pgs.

Uber, "Fast-Forwarding to a Future of On-Demand Urban Air Transportation Introduction", Uber Elevate, URL:https:www.uber.com elevate.pdf[retrieved on Nov. 26, 2018], (Oct. 27, 2016), 98 pgs.

Bennaceur et al., "Passenger-centric urban air mobility: Fairness trade-offs and operational efficiency", Transportation Research: Emerging Technologies, 2021, 29 pages.

Jong, "Optimizing cost effectiveness and flexibility of air taxis: A case study for optimization of air taxi operations", University of Twente, Master's thesis, 2007, 62 pages.

Miao et al., "Data-driven robust taxi dispatch under demand uncertainties", IEEE Transactions on Control Systems Technology 27, No. 1, 2017, 16 pages.

Miao et al., "Taxi dispatch with real-time sensing data in metropolitan areas: A receding horizon control approach", In Proceedings of the ACM/IEEE Sixth International Conference on Cyber-Physical Systems, 2015, 15 pages.

Uber, "Fast-forwarding to a future of on-demand urban air transportation", 2016, 99 pages.

* cited by examiner

AERIAL RIDE QUALITY IMPROVEMENT SYSTEM USING FEEDBACK

REFERENCE TO RELATED APPLICATIONS

This application claims the priority benefit of U.S. Provisional Patent Application No. 62/931,509 filed Nov. 6, 2019 and entitled "Aerial Ride Quality Improvement Using User Feedback," which is incorporated herein by reference in its entirety.

TECHNICAL FIELD

The subject matter disclosed herein generally relates to machines configured to manage aerial ride quality, and to technologies by which such special-purpose machines become improved compared to other machines that manage ride quality. Specifically, the present disclosure addresses systems and methods to improve aerial ride quality based on user feedback.

BACKGROUND

Oftentimes, an aerial vehicle experiences turbulence or other perturbations or environmental disturbances that may cause a passenger to become uncomfortable. In aerial vehicles that have a pilot also experiencing the same discomfort, the pilot may adjust the aerial vehicle to avoid or compensate for the discomfort. However, this is not possible for autonomous aerial vehicles.

BRIEF DESCRIPTION OF DRAWINGS

Various ones of the appended drawings merely illustrate example embodiments of the present invention and cannot be considered as limiting its scope.

DETAILED DESCRIPTION

The description that follows includes systems, methods, techniques, instruction sequences, and computing machine program products that embody illustrative embodiments of the present inventive subject matter. In the following description, for purposes of explanation, numerous specific details are set forth in order to provide an understanding of various embodiments of the inventive subject matter. It will be evident, however, to those skilled in the art, that embodiments of the inventive subject matter may be practiced without some or other of these specific details. In general, well-known instruction instances, protocols, structures, and techniques have not been shown in detail. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example embodiments are directed to a system that employs feedback accessed from an aerial vehicle and devices associated with passengers to improve an aerial ride quality. The feedback is received and assigned a timestamp that can be attributed to a portion of a flight. Using that portion of the flight, a network system can identify where on a route an issue indicated by the feedback occurs and what the weather conditions (e.g., meteorology data) were at that location. The issue may include discomfort, air sickness, or related issues experienced by passengers during flights. Additionally, a time of day the issue occurs is recorded. Using all of this information, the network system can identify a root cause of the issue based on knowledge of the route and known conditions, accessed from a database, that correlate to root causes of issues. The network system also determines mitigation action(s) to help a current aerial vehicle experiencing the issue and/or help downstream aerial vehicles flying along the same route or through the same corridor or skylane (an area of airspace designated for urban air mobility operations) to avoid the issue.

Figure 1:
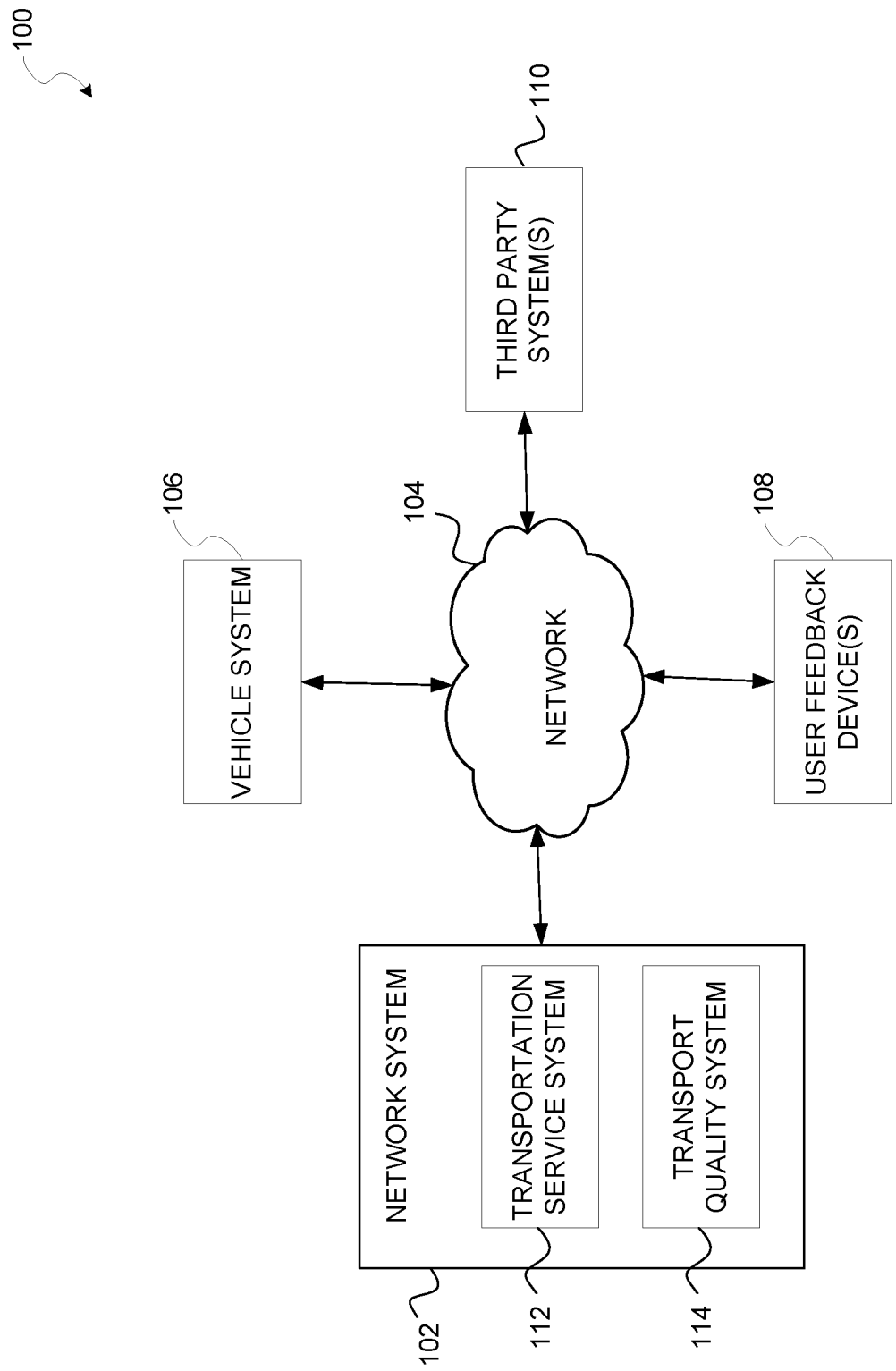
FIG. 1 is a diagram illustrating a network environment suitable for providing a network system for improving aerial ride quality based on user feedback, according to some example embodiments.

With reference to FIG. 1, an example embodiment of a network environment 100 that provides a network system for improving aerial ride quality based on user feedback is shown. A network system 102 provides functionality via a communication network 104 to a plurality of aerial vehicles, whereby each aerial vehicle comprises a vehicle system 106. In example embodiments, the aerial vehicles are unmanned or autonomous vehicles (e.g., there is no pilot on board). In some embodiments, the aerial vehicle are electric vehicles. The network system 102 also communicates with one or more user feedback devices 108 that are associated with passengers on the aerial vehicles.

Further still, the network system 102 communicates with third-party systems 110 that provide third-party data used by the network system 102 to derive root causes of issues experienced by the passengers. In some embodiments, the third-party data may be received via an application protocol interface (API) call to/from the third party systems 110. For example, the third-party systems 110 can include a meteorology data or forecasting source, a ground-based air turbulence data or forecasting source, and/or other flight management networks. The other flight management networks may manage aerial vehicles that are not managed by the network system 102. The third-party data from the other flight management networks may be used to route or reroute aerial vehicles in such a manner as to avoid aerial vehicles managed by the other flight management networks.

Depending on the form of each of the devices and systems of the network environment 100, any of a variety of types of connections and networks 104 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the network 104 may include a cellular network that has a plurality of cell sites of overlapping geographic coverage, interconnected by cellular telephone exchanges. These cellular telephone exchanges may be coupled to a network backbone (e.g., the public switched telephone network (PSTN), a packet-switched data network, or other types of networks). In another example, the connection to the network 104 may be a Wireless Fidelity (Wi-Fi, IEEE 802.11x type) connection, a Worldwide Interoperability for Microwave Access (WiMAX) connection, or another type of wireless data connection. In such an embodiment, the network 104 may include one or more wireless access points coupled to a local area network (LAN), a wide area network (WAN), the Internet, or another packet-switched data network. In yet another example, the connection to the network 104 may be a wired connection (e.g., an Ethernet link), and the network 104 may be a LAN, a WAN, the Internet, or another packet-switched data network. Accordingly, a variety of different configurations are expressly contemplated.

The user feedback devices 108 may comprise, but are not limited to, a smartphone, smartwatch, tablet, laptop, multi-processor systems, microprocessor-based or programmable consumer electronics, a server, or any other communication device that may be utilized to provide user feedback to the network system 102. In some embodiments, the user feedback device 108 is a sensor or input mechanism built into the aerial vehicle (e.g., within a seat of the passenger, within a handle or grip on the aerial vehicle) that provides passive feedback or a device provided within the aerial vehicle (e.g., a tablet or touchscreen within and associated with the aerial vehicle). In example embodiments, a plurality of user feedback devices 108 can be associated with each passenger. For example, a passenger may be associated with a sensor in their seat, a sensor in a handle, a sensor in a seatbelt, a touchscreen at their seat, and a personal user device (e.g., a smartphone or tablet).

In some embodiments, the user feedback device 108 may be a user device that includes one or more applications (also referred to as "apps") for requesting a transportation service that results in a flight in the aerial vehicle or for providing user feedback. In these cases, the user uses a transportation service application to request a transportation service (also referred to herein as a "trip") from a first location to a second location. In some cases, the first location corresponds to a first hub where an aerial transportation service begins, and the second location corresponds to a second hub where the aerial transportation service ends. In other cases, the user may request a 3-leg trip that includes (1) pickup by a first ground vehicle and transportation to the first hub (also referred to as a vertiport, aerodrome, or skyport); (2) aerial transportation from the first hub to the second hub; and (3) transportation in a second ground vehicle from the second hub to a final destination. Alternatively, the user may request a 2-leg trip with either a pickup by the first ground vehicle or transportation in the second ground vehicle, along with the aerial transportation. In all these cases, a transportation service system 112 of the network system 102 receives the request for transportation service and arranges for vehicles (e.g., ground and/or aerial vehicles) and any necessary service providers (e.g., drivers) to provide service for the trip.

The transportation service system 112 can also "reschedule" transportation services if actions performed to mitigate an issue (e.g., re-routing a vehicle in real-time based on feedback) cause downstream effects on the trip (e.g., a delay). For example, a reroute of the aerial vehicle may delay arrival of the user at the second hub. Thus, there may be a need for an adjustment in the user's itinerary (e.g., reserve a different ground vehicle for the final leg that will be available when the user arrives at the second hub). The transportation service system 112 may automatically make the adjustment in response to detecting the delay caused by the mitigating action. Conversely, a reroute or other mitigation action may result in the user arriving earlier than expected. In this situation, the transportation service system 112 can also adjust the itinerary for early arrival (e.g., have the ground vehicle available when the user arrives early). The automatic adjustments by the transportation service system 112 includes determining available vehicles or service providers for the estimated time needed, exchanging communications (e.g., with the service providers) to secure their services, and/or updating the user of the change in the trip (e.g., via a user interface or notification provided through the transportation service application).

The network system 102 also includes a transport quality system 114. The transport quality system 114 accesses (e.g., receives, retrieves, obtains) data from the sensors on the vehicle system 106, data from the user feedback devices 108, and third-party systems 110. Using the aggregated data, the transport quality system 114 identifies one or more root causes for an issue that one or more passengers may be experiencing (or have experienced) on a flight. The transport quality system 114 then determines one or more mitigation actions and determines whether to apply the mitigation action. The transport quality system 114 will be discussed in more detail in FIG. 2 below.

In example embodiments, any of the systems or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 7, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or devices illustrated in FIG. 1 may be combined into a single system or device, and the functions described herein for any single system or device may be subdivided among multiple systems or devices. For example, the user feedback device 108 may be a part of the vehicle system 106. Additionally, any number of network systems 102, vehicle systems 106, user feedback devices 108, and third-party systems 110 may be embodied within the network environment 100.

Figure 2:
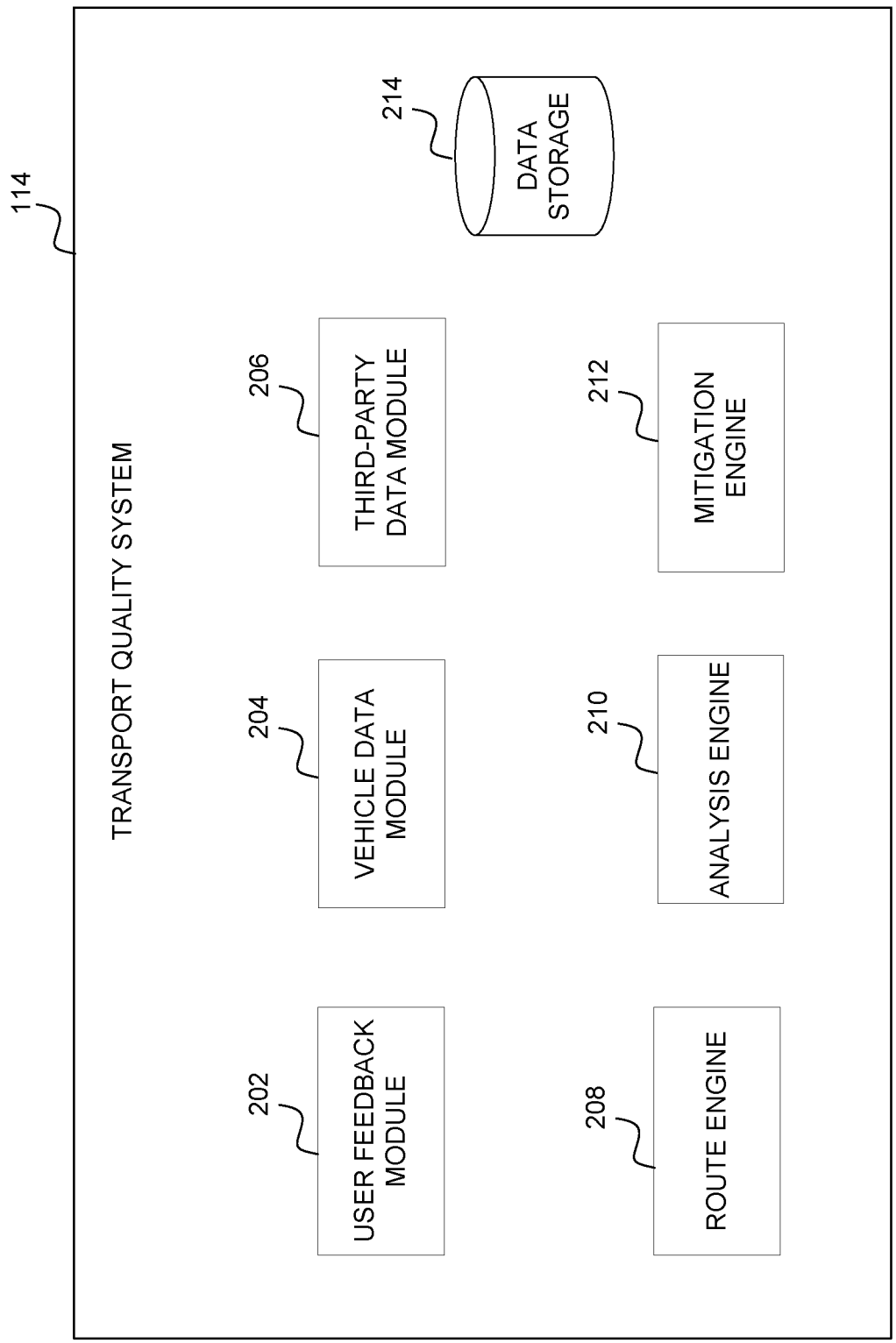
FIG. 2 is a block diagram illustrating components of a transport quality system of the network system, according to some example embodiments.

FIG. 2 is a block diagram illustrating components of the transport quality system 114, according to some example embodiments. In example embodiments, the transport quality system 114 comprises one or more servers or components that manages aerial ride quality. To enable this operation, the transport quality system 114 comprises a user feedback module 202, a vehicle data module 204, a third-party data module 206, a route engine 208, an analysis engine 210, a mitigation engine 212, and a data storage 214 all configured to communicate with each other (e.g., via a bus, shared memory, or a switch). The transport quality system 114 may also comprise other components (not shown) that are not pertinent to example embodiments. Furthermore, any one or more of the components (e.g., engines, modules, generators) described herein may be implemented using hardware (e.g., a processor of a machine) or a combination of hardware and software. Moreover, any two or more of these components may be combined into a single component, and the functions described herein for a single component may be subdivided among multiple components.

The user feedback module 202 accesses (e.g., receives, retrieves, detects) user feedback data from the user feedback devices 108 associated with each passenger. In some embodiments, the user feedback data is received via an application protocol interface (API) call from one or more user feedback devices 108. The user feedback data can be received in real-time while the passenger is inflight and/or after the passenger has completed a flight. In some embodiments, the user feedback data can be passive. For example, the user feedback data can comprise sensor measurements from a device (e.g., the user feedback device 108) in contact with the passenger (e.g., a seat or seatbelt of the passenger), whereby the sensor measurements indicates pressure (or load) or weight distribution caused by movement of the passenger. For instance, a sudden shift in pressure may indicate turbulence. In another example, the user feedback data can comprise a sensor input indicating touch by the passenger (e.g., gripping a handle that has a sensor that detects the grip which can indicate turbulence). Further still, the user feedback data can be an utterance by the user indicating an issue that is detected by the user feedback device 108 (e.g., a microphone or audio detection sensor). In some embodiments, the user feedback data can also include explicit user feedback. For example, the passenger can provide explicit user feedback via a transportation service application on their personal device (e.g., smartphone, tablet, laptop) or on a tablet or touchscreen provided within the aerial vehicle.

The vehicle data module 204 accesses (e.g., receives, retrieves, obtains) vehicle data from aerial vehicles. In some embodiments, the vehicle data is received via an application protocol interface (API) call from one or more components of the aerial vehicle. The vehicle data may comprise data such as, for example, maneuvers (e.g., yaw, pitch, roll), altitude, temperatures (e.g., interior and exterior), speed, and acceleration at any given time. The vehicle data can also include any perturbation the aerial vehicle experienced (e.g., sudden change in altitude, pitch, roll, or yaw). In some cases, perturbation or turbulence can be detected in near real-time by sensors on the aerial vehicle and transmitted to the vehicle data module 204. The vehicle data may be continuously detected by sensors during a flight by the aerial vehicles and transmitted to the transport quality system 114 (e.g., the vehicle data module 204).

In example embodiments, the user feedback data (e.g., both device-derived, passive feedback and explicit passenger-provided feedback) and the vehicle data are timestamped and stored to the data storage 214. The timestamp can indicate a time that issues occur, which can be used to derive a portion of the route where the issues occur, as will be discussed in more detail below. The time may also affect, or be correlated with, certain pressure and temperature values and/or changes.

The third-party data module 206 accesses third-party data from the third-party systems 110. The third-party data can include, for example, meteorology data from a meteorology data source or air turbulence measurements from a ground-based measurement system. The third-party data can also include flight data from other flight management networks that manage other aerial vehicles. The third-party data from the other flight management networks may be used to route or reroute network system 102 aerial vehicles in such a manner as to avoid aerial vehicles managed by the other flight management networks. The third-party data can also indicate issues experienced by aerial vehicles not managed by the network system 102.

The route engine 208 manages routes for aerial vehicles. In example embodiments, the route engine 208 determines a route for each aerial vehicle being managed by the network system 102 and transmits the route data to the aerial vehicle. The route engine 208 may also track aerial vehicles associated with the network system 102, as well as aerial vehicles managed by other air traffic management systems. The route engine 208 can also reroute an aerial vehicle managed by the network system 102, suggest a change in altitude, or change a route of one or more future or downstream aerial vehicles traveling between similar/same locations (e.g., using the same skylane) where one or more issues were detected based on the feedback. In example embodiments, the route engine 208 is constantly processing data and sending out commands to the aerial vehicles managed by the network system 102. While the route engine 208 is shown to be a part of the transportation quality system 114, the route engine 208 may be located elsewhere in the network system 102 (e.g., in the transportation service system 112) in alternative embodiments.

In some embodiments, routing information from the route engine 208 is transmitted to the analysis engine 210 for use in the analysis. For instance, the routing information may be used by the analysis engine 210 to determine a portion of the route (e.g., a location) where an issue occurred based on timestamps of the feedback.

The analysis engine 210 is configured to analyze the aggregated data (e.g., user feedback, vehicle data, third-party data) and derive a root cause of one or more issues experienced by passengers of aerial vehicles based, in part, on the feedback data. In example embodiments, the analysis engine 210 derives the root cause by correlating the aggregated data with known data (e.g., known conditions that indicate a root cause of an issue) accessed from the data storage 214. For example, the user feedback data may indicate the cabin is hot, a timestamp correlates the user feedback data to a particular location or portion on the route, the aerial vehicle data registers an interior temperature of 30° C. at the same timestamp, and the third-party data (e.g., meteorology data) indicates high temperatures at that portion on the route. Thus, the assigned timestamps are attributed to a portion of the flight, whereby during that portion of the flight, the analysis engine 210 can determine where on the route an issue occurred and what the meteorological conditions were that influenced the issue. Here, the combination of this data indicates that the aerial vehicle experienced high heat in that portion of the route at that time of day and that the air conditioning was not on, not working, or was set at too high a temperature on the aerial vehicle.

In example embodiments, the analysis engine 210 includes a natural language processor. In some cases, sensors on the aerial vehicle detects words or comments (also referred to as "utterances") from passengers. The utterances can include, for example, "turbulence," "shaking," "hot," "cold," "sharp turn," "quick drop," "feeling nauseous," or "whoa!" The utterances are processed by the natural language processor to detect what the utterances mean. The utterances can then be correlated by the analysis engine 210 to an issue using the natural language processor and a natural language library (e.g., stored in the data storage 214). For instance, "turbulence" and "shaking" can be correlated to turbulence on the aerial vehicle while "hot" or "cold" can be correlated with air temperature aloft or temperature on board the aerial vehicle. Additionally, "sharp turn," "quick drop," "feeling nauseous," or "whoa!" can be correlated with the aerial vehicle maneuvering too swiftly for the passenger's comfort.

In some embodiments, the data may be analyzed against historical data by the analysis engine 210. The historical data can be accessed from the data storage 214 and may include flight logs and previously identified issues. The analysis may indicate a pattern associated with an issue. The analysis can also detect whether same trips with similar conditions experiences the same issues and/or what deltas (e.g., differences in issues or non-issues) occurred. Historical data can also be used to identify periods of time or seasons that certain issues occur (e.g., more turbulence in the morning, during a particular two-week period, or during winter). The historical data can also be used to determine how a particular aerial vehicle type performed over the years. For example, the analysis may indicate that aerial vehicles of a first type (e.g., from a first aircraft manufacturer) typically experience more turbulence in the morning on the route from hub A to hub B than aerial vehicles of a second type (e.g., from a second aircraft manufacturer). Additionally, analysis with historical data allows the analysis engine 210 to correlate if the aerial vehicle was being controlled in a different manner that lead to passenger discomfort.

In some embodiment, the data may be weighted by the analysis engine 210. For example, explicit user feedback (e.g., passenger-provided user feedback) may be weighted higher than passive user feedback (e.g., device-derived user feedback) from sensors or user feedback from a frequent passenger may be weighted higher than a new or infrequent passenger.

The mitigation engine 212 is configured to derive actions to mitigate issues based on root causes identified by the analysis engine 210 and to determine whether to apply the mitigation actions. The mitigation action can include, for example, a rerouting of the aerial vehicle, changing a route of future aerial vehicles traveling in the same skylane, or changing a condition of the aerial vehicle (e.g., speed up or slow down the aerial vehicle; turn on/off air conditioning). In some embodiments, the mitigation action can comprise changing an aerial vehicle type used for future flights operating on a same route as the aerial vehicle based on factors such as time of day. For example, a first aerial vehicle type may be able to handle turbulence along a specific route better than a second aerial vehicle. The mitigation action may also include removing an aerial vehicle from service (e.g., to fix a mechanical issue).

In some embodiments, the mitigation engine 212 determines more than one mitigation action for a detected issue. In these embodiments, the mitigation engine 212 may filter/rank the mitigation actions to select the mitigation action that has a minimal impact on the ground (e.g., maintain low noise levels) or is most efficient. For example, the mitigation engine 212 may select the mitigation action that uses the least amount of power to implement by the aerial vehicle or deviates the aerial vehicle the least amount of distance. In another example, the mitigation engine 212 may select the mitigation action(s) that cause the least amount of delay for reaching a final destination. In cases where the mitigation engine 212 selects a mitigation action that causes the least amount of delay, the mitigation engine 212 may work with the route engine 208 or the transportation service system 112 to determine a change in estimated time of arrival that a change in a portion of the route will cause.

In some embodiments, the mitigation engine 212 determines whether to perform the mitigation action. Each issue or root cause may have a corresponding threshold that should be traversed before the mitigation action is triggered to occur. For example, a threshold number of passengers within a threshold amount of time may need to experience the same issue (e.g., on the same flight or flights along a similar portion of the route) before the mitigation action is triggered by the mitigation engine 212. In another example, a threshold amount of discomfort needs to be transgressed before the mitigation action is triggered. For instance, while passengers may feel turbulence on a flight, the amount of turbulence may be required to be over a threshold distance or time before the mitigation action (e.g., reroute or change in altitude) is triggered. Some mitigation actions will have lower threshold than others. For instance, triggering the aerial vehicle to adjust temperature (e.g., turn on air conditioning or heat) may have a lower threshold than adjusting a portion of the route that the aerial vehicle (or subsequent aerial vehicles) travels.

The mitigation engine 212 also causes the mitigation action to occur. In some embodiments, the mitigation engine 212 may trigger the route engine 208 to change routes of future/downstream aerial vehicles managed by the network system 102 traveling between the same locations or along a portion of the route that experienced the issue. Additionally, the mitigation engine 212 (or route engine 208) can send instructions to the aerial vehicle to, for example, change a current route, change speed, alter the aerial vehicle's maneuvering characteristics, or change altitude while inflight (e.g., from which the user feedback was received from the passenger indicating a current issue). The mitigation engine 212 can also transmit instructions (e.g., to a flight planning system, the transportation service system 112, or the route engine 208) to select a different aerial vehicle type for one or more future flights along the same or similar route (or portion of the route) based on time of day, date, season, and so forth.

Figure 3:
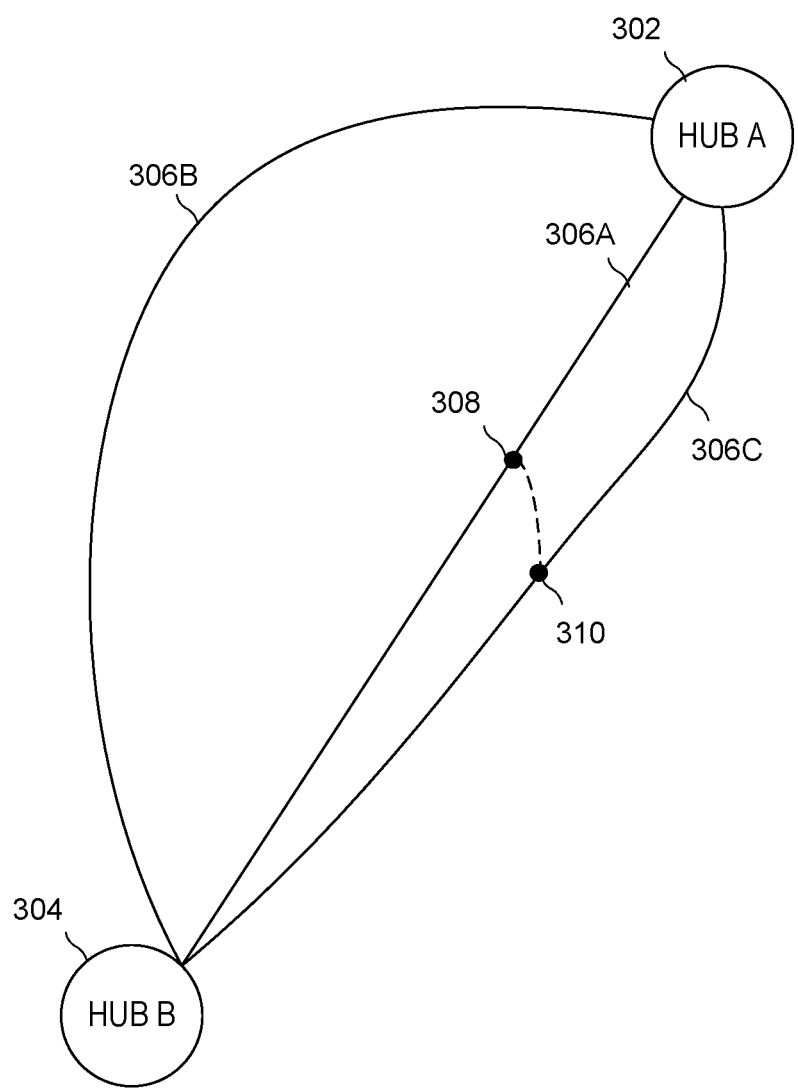
FIG. 3 illustrates an example route change.

Referring to FIG. 3, an illustration of an example route change is shown. The aerial vehicle is traveling form hubA 302 to hubB 304 along a first route 306a. There may be several different routes (e.g., 306a, 306b, 306c) between hubA 302 and hubB 304. The different routes 306a, 306b, 306c may be thought of as running along skylanes that connect the two hubs 302 and 304. In some embodiments, the skylanes are parallel to each other but located at different altitudes. In some embodiments, the skylanes are at a same or similar altitude but offset in distance from each other. Further still, different combinations of skylanes at different altitudes or distances can be used. If the mitigation engine 212 determines that a route change should occur during a flight, instructions are sent to the aerial vehicle to switch between the skylanes. As shown, the aerial vehicle receives instructions at location 308 and switches to route 306c at location 310. Further still, the mitigation engine 212 may trigger (e.g., via a flight planning system, the transportation service system 112, or the route engine 208) downstream aerial vehicles to deviate to a different skylane or select alternate routes upon take-off.

Figure 4:
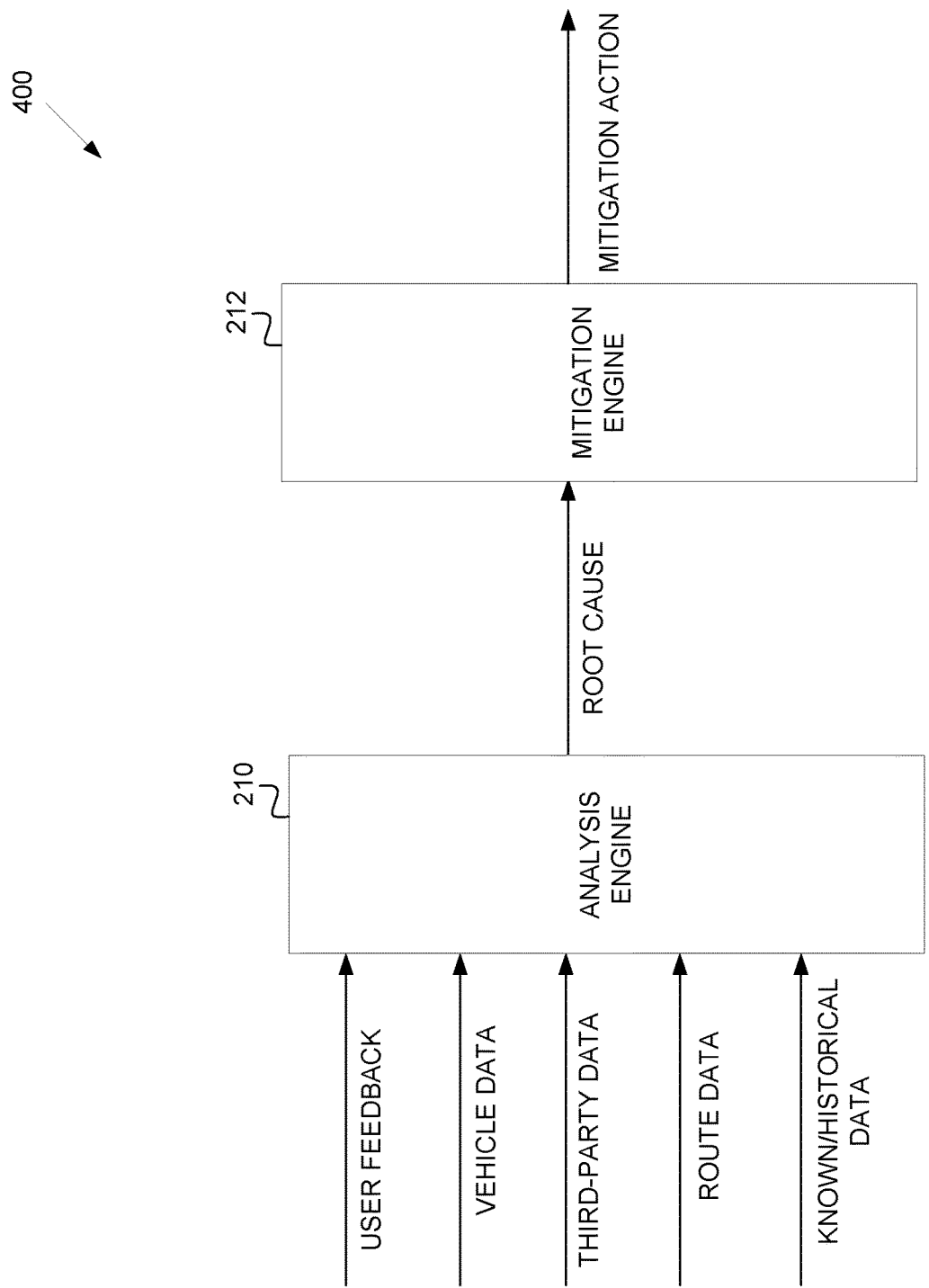
FIG. 4 is a diagram illustrating a data flow for improving aerial ride quality based on user feedback, according to some example embodiments.

Referring now to FIG. 4, a diagram illustrating a data flow 400 for improving aerial ride quality based on user feedback, according to some example embodiments, is shown. In example embodiments, various data is aggregated or accessed by the analysis engine 210 and analyzed to detect a root cause of an issue experienced by one or more passengers on an aerial vehicle. The data can include one or more of feedback data from user feedback devices 108 of the passengers (e.g., in real-time or after a flight), vehicle data of the aerial vehicle (e.g., performance and environmental data from sensors on the aerial vehicle), third-party data (e.g., meteorology data, turbulence data, or noise data from third-party systems 110), route data of the route being flown by the aerial vehicle (e.g., from the route engine 208), known data (e.g., known conditions corresponding to root causes of issues), and historical data (e.g., for a same or similar route, for a same or similar aerial vehicle on the same or similar route). In some embodiments, the known data may comprise a database correlating the known conditions to root causes of issues. In some embodiments, the known data may be machine-learned. For instance, a model may be built based on training data that includes issues, aggregated data, and mitigation actions previously performed. The output of the model, during runtime, can include one or more mitigation actions based on aggregated data and/or the corresponding issue.

The analysis engine 210 analyzes the data by correlating and analyzing (e.g., comparing) the user feedback data, vehicle data, third-party data, and route data with the known data from the data storage 214. The analysis engine 210 may also analyze the various data against historical data to identify a pattern of issues or root causes along the same route or experiences by the same aerial vehicle type. The result of the analysis engine 210 comprises one or more root causes for issues experienced by the passengers.

The root cause (or root causes) outputted by the analysis engine 210 are transmitted to the mitigation engine 212, which determines one or more mitigation actions. The mitigation actions may be determined from a set of mitigation actions identified from known data in a data storage, in some embodiments. For example, a mitigation action database may comprise correlations of root causes to mitigation actions. In some embodiments, the mitigation action may be determined from machine learning based on past similar aggregated data and corresponding mitigation actions used as training data. In some embodiments, the mitigation engine 212 also determines whether to trigger the mitigation action, for example, based on thresholds. Finally, the mitigation engine 212 can cause the mitigation action to occur.

Figure 5:
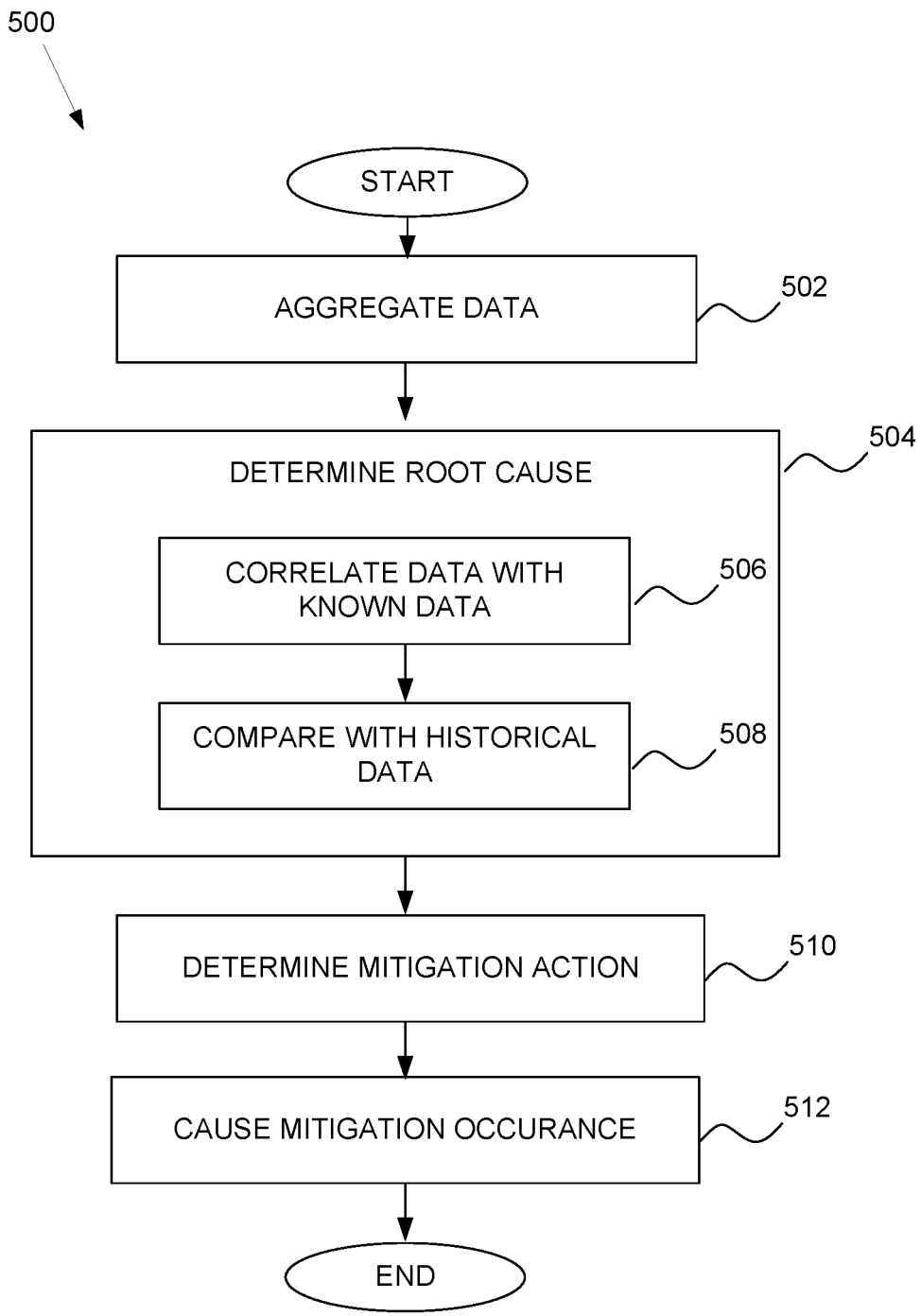
FIG. 5 is a flowchart illustrating operations of a method for improving aerial ride quality based on user feedback, according to some example embodiments.

FIG. 5 is a flowchart illustrating operations of a method 500 for improving aerial ride quality based on user feedback, according to some example embodiments. Operations in the method 500 may be performed by the network system 102 (e.g., the transport quality system 114), using components described above with respect to FIG. 2. Accordingly, the method 500 is described by way of example with reference to the network system 102. However, it shall be appreciated that at least some of the operations of the method 500 may be deployed on various other hardware configurations or be performed by similar components residing elsewhere in the network environment 100. Therefore, the method 500 is not intended to be limited to the network system 102.

In operation 502, the network system 102 aggregates data used to improve aerial ride quality. In example embodiments, various components of the network system 102 accesses, obtains, or retrieves different data associated with the aerial vehicle and one or more passengers on the aerial vehicle. Operation 502 will be discussed in more detail in connection with FIG. 6 below.

In operation 504, the analysis engine 210 determines a root cause of an issue experienced by one or more passengers on the aerial vehicle. In example embodiments, the determination of the root cause includes correlating the aggregated data with known data (e.g., known conditions that indicate a root cause of an issue) in operation 506. For example, the user feedback data is correlated with vehicle data (also referred to as "vehicle flight data"), route data, and third-party data. The correlation may provide an indication of a root cause of the issue based on knowledge of similar correlations (e.g., from the known data). For example, the user feedback can indicate discomfort at a particular location on the route where the aerial vehicle had a sudden change in altitude or attitude and the third-party data indicates strong gusts at that location. The combination of this data will indicate, based on the known data, that the aerial vehicle experiences sudden turbulent at that location on the route due to weather conditions.

In some embodiments, the aggregated data may be compared to historical data in operation 508. The comparison may indicate a pattern associated with the issue. For example, the comparison may indicate that aerial vehicles of a first type (e.g., from a first aircraft manufacturer) typically experiences more turbulence in the morning on the route from hub A to hub B than aerial vehicles of a second type (e.g., from a second aircraft manufacturer). In another example, the comparison may indicate that a particular route typically experiences turbulence during a particular time period (e.g., time of day, season).

In operation 510, the mitigation engine 212 determines one or more mitigation actions based on the root cause. In some embodiments, the mitigation actions may be determined from a set of mitigation actions identified from a data storage. For example, a mitigation action database may comprise correlations of root causes to mitigation actions from which the mitigation engine 212 derives the mitigation action(s). In some embodiments, the mitigation action(s) may be determined from machine learning based on past similar aggregated data and corresponding mitigation actions used as training data. The mitigation action can include, for example, a rerouting of the aerial vehicle, changing a route of future/downstream aerial vehicles traveling between same locations, or changing a condition of the aerial vehicle (e.g., speed up or slow down the aerial vehicle; change altitude, turn on/off air conditioning). In some embodiments, the mitigation action can comprise changing an aerial vehicle type used for future flights operating on a same route as the aerial vehicle.

In operation 512, the mitigation engine 212 causes the mitigation action to occur. In some embodiments, the mitigation engine 212 may trigger the route engine 208 to change a current route of an aerial vehicle or change routes of future aerial vehicles managed by the network system 102 traveling between the same locations. Additionally, the mitigation engine 212 can trigger (e.g., send instructions to) the aerial vehicle managed by the network system 102 to change speed, route, or altitude of the aerial vehicle while inflight (e.g., from which the user feedback was received from the passenger indicating the issue). The mitigation engine 212 can also trigger or transmit instructions, for example, to a flight planning system or the route engine 208, to select a different aerial vehicle type for one or more future flights along the same or similar route based on time of day, date, season, and so forth.

Figure 6:
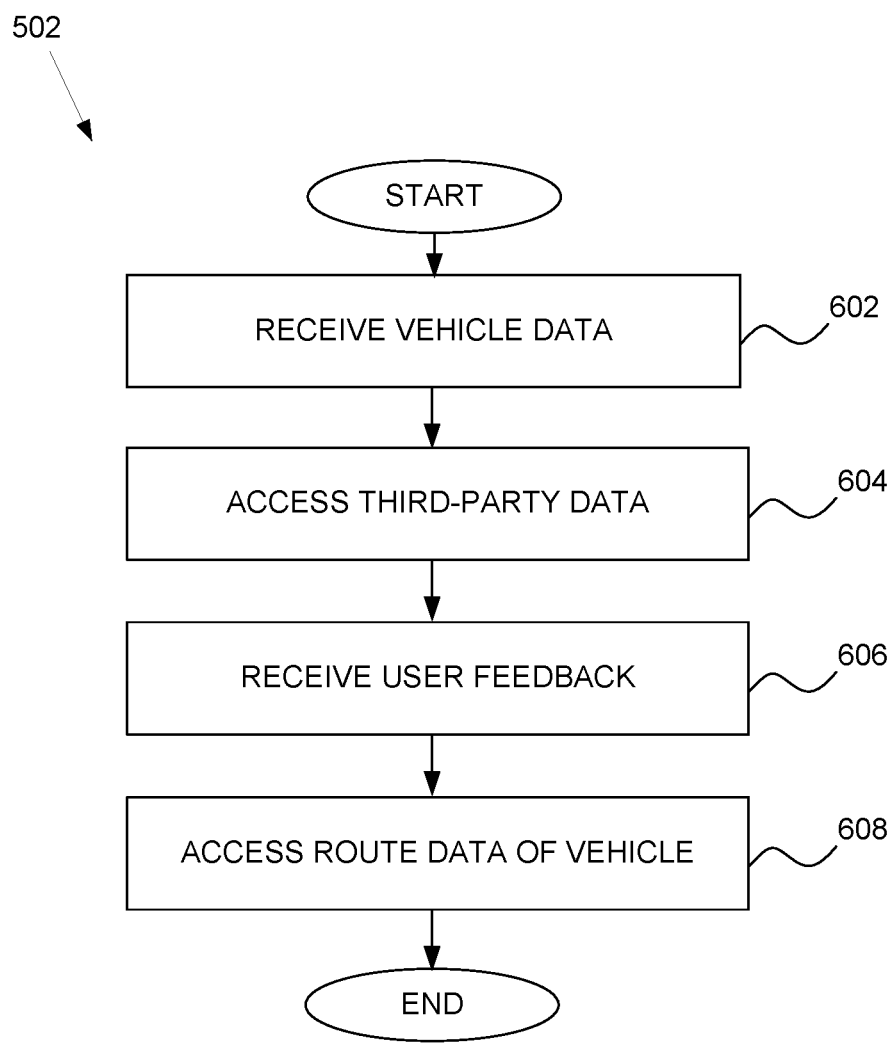
FIG. 6 is a flowchart illustrating operations of a method for aggregating data used to improve aerial ride quality, according to some example embodiments.

FIG. 6 is a flowchart illustrating operations of a method (e.g., operation 502) for aggregating data used to improve aerial ride quality, according to some example embodiments. Operations in the method may be performed by the network system 102 (e.g., the transport quality system 114), using components described above with respect to FIG. 2. Accordingly, the method 600 is described by way of example with reference to the network system 102. However, it shall be appreciated that at least some of the operations of the method may be deployed on various other hardware configurations or be performed by similar components residing elsewhere in the network environment 100. Therefore, the method is not intended to be limited to the network system 102.

In operation 602, the vehicle data module 204 receives vehicle data from sensors of the aerial vehicle. The vehicle data may comprise data such, for example, deflection, yaw, pitch, roll, altitude, temperatures (e.g., interior and exterior), speed, and acceleration at any given time. The vehicle data may be continuously received during a flight from the aerial vehicle and timestamped by the vehicle data module 204.

In operation 604, the third-party data module 206 accesses third-party data from third-party systems 110. The third-party data can include, for example, meteorology data or noise measurements. The third-party data can also include data from other flight management networks that manage aerial vehicles that are not managed by the network system 102. The third-party data from the other flight management networks may be used to route or reroute aerial vehicles in such a manner as to avoid aerial vehicles managed by the other flight management networks.

In operation 606, the user feedback module 202 receives user feedback data from the user feedback devices 108. The feedback data can comprise sensor measurements from the user feedback devices 108 associated with the passenger (e.g., a seat, seat belt, or harness of the passenger), whereby the sensor measurements indicates pressure (or load) caused by movement of the passenger. The feedback data can comprise a sensor input indicating touch by the passenger (e.g., gripping a handle that has a sensor that detects the grip). Further still, the feedback data can be an utterance by the user indicating an issue, such as, "turbulence," "nervous," "nauseous," and so forth. The feedback data may be received in substantially real-time, inflight, or after the flight. The passenger can also provide feedback data via a transportation service application on their user device (e.g., smartphone) that was used to obtain flight transportation on the aerial vehicle. The feedback data is timestamped in order to correlate the feedback data to, for example, the vehicle data and the route data.

In operation 608, route data of the aerial vehicle is accessed from the route engine 208 by the analysis engine 210. The route data indicates the route that the aerial vehicle is/has travelled and a position of the aerial vehicle at any given time.

While the various operations show an order to the aggregation of the data by the transport quality system 114, it is noted that the various data can be received in any order, at any time (e.g., during or after a flight), from any one or more data sources or passengers.

Figure 7:
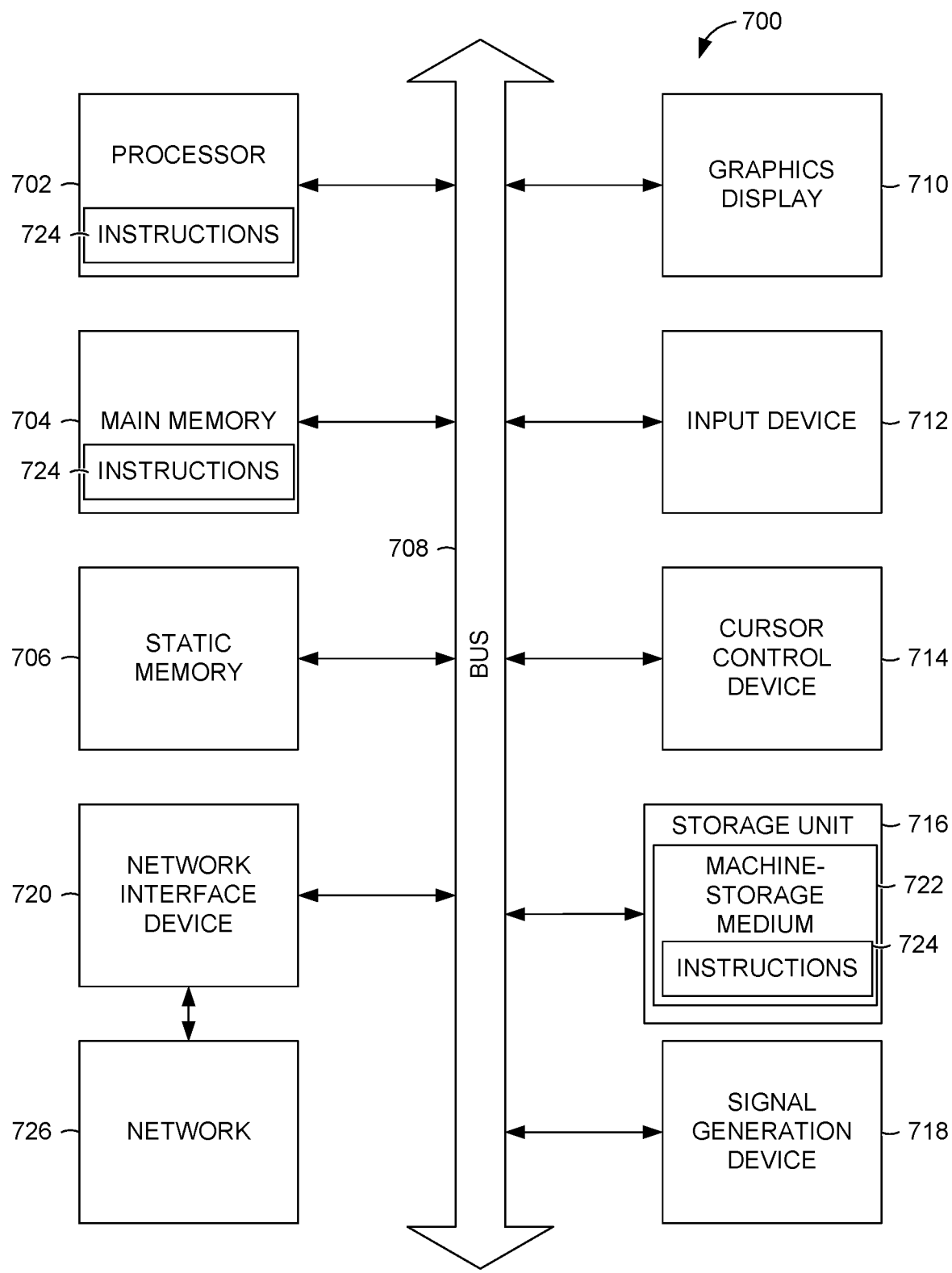
FIG. 7 is a block diagram illustrating components of a machine, according to some example embodiments, able to read instructions from a machine-storage medium and perform any one or more of the methodologies discussed herein.

FIG. 7 illustrates components of a machine 700, according to some example embodiments, that is able to read instructions from a machine-storage medium (e.g., a machine storage device, a non-transitory machine-readable storage medium, a computer storage medium, or any suitable combination thereof) and perform any one or more of the methodologies discussed herein. Specifically, FIG. 7 shows a diagrammatic representation of the machine 700 in the example form of a computer device (e.g., a computer) and within which instructions 724 (e.g., software, a program, an application, an applet, an app, or other executable code) for causing the machine 700 to perform any one or more of the methodologies discussed herein may be executed, in whole or in part.

For example, the instructions 724 may cause the machine 700 to execute the communication flow and flowchart of FIG. 4 through FIG. 6. In one embodiment, the instructions 24 can transform the general, non-programmed machine 700 into a particular machine (e.g., specially configured machine) programmed to carry out the described and illustrated functions in the manner described.

In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a smartwatch, a web appliance, a network router, a network switch, a network bridge, or any machine capable of executing the instructions 724 (sequentially or otherwise) that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The processor 702 may contain microcircuits that are configurable, temporarily or permanently, by some or all of the instructions 724 such that the processor 702 is configurable to perform any one or more of the methodologies described herein, in whole or in part. For example, a set of one or more microcircuits of the processor 1002 may be configurable to execute one or more modules (e.g., software modules) described herein.

The machine 700 may further include a graphics display 710 (e.g., a plasma display panel (PDP), a light emitting diode (LED) display, a liquid crystal display (LCD), a projector, or a cathode ray tube (CRT), or any other display capable of displaying graphics or video). The machine 700 may also include an alphanumeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a sound card, an amplifier, a speaker, a headphone jack, or any suitable combination thereof), and a network interface device 720.

The storage unit 716 includes a machine-storage medium 722 (e.g., a tangible machine-storage medium) on which is stored the instructions 724 (e.g., software) embodying any one or more of the methodologies or functions described herein. The instructions 724 may also reside, completely or at least partially, within the main memory 704, within the processor 702 (e.g., within the processor's cache memory), or both, before or during execution thereof by the machine 700. Accordingly, the main memory 704 and the processor 702 may be considered as machine-readable media (e.g., tangible and non-transitory machine-readable media). The instructions 724 may be transmitted or received over a network 726 via the network interface device 720.

In some example embodiments, the machine 700 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 704, 706, and/or memory of the processor(s) 702) and/or storage unit 716 may store one or more sets of instructions and data structures (e.g., software) 724 embodying or utilized by any one or more of the methodologies or functions described herein. These instructions, when executed by processor(s) 702 cause various operations to implement the disclosed embodiments.

As used herein, the terms "machine-storage medium," "device-storage medium," "computer-storage medium" (referred to collectively as "machine-storage medium 722") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 722 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 722 specifically exclude carrier waves, modulated data signals, and other such media, at least some of which are covered under the term "signal medium" discussed below. In this context, the machine-storage medium or machine-storage media is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 724 may further be transmitted or received over a communications network 726 using the transmission medium via the network interface device 720 and utilizing any one of a number of well-known transfer protocols (e.g., HTTP). Examples of communication networks 726 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 724 for execution by the machine 700, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for improving aerial ride quality based on user feedback. The method comprises receiving, by a network system from one or more devices associated with a passenger on an aerial vehicle, user feedback data regarding a flight, the user feedback data being associated with an issue experienced by the passenger; identifying, by the network system, a root cause of the issue experienced by the passenger on the aerial vehicle, the identifying including correlating the user feedback data with other data associated with the flight; determining, by the network system, a mitigation action to mitigate the issue; and triggering, by the network system, the mitigation action to occur.

In example 2, the subject matter of example 1 can optionally include wherein receiving the user feedback data occurs while the passenger is inflight.

In example 3, the subject matter of any of examples 1-2 can optionally include wherein receiving the user feedback data comprises receiving sensor measurements from the one or more devices associated with the passenger, the sensor measurements indicating a weight distribution and any pressure caused by passenger movement.

In example 4, the subject matter of any of examples 1-3 can optionally include wherein receiving the user feedback data comprises receiving a sensor input from the one or more devices associated with the passenger, the sensor input indicating touch by the passenger.

In example 5, the subject matter of any of examples 1-4 can optionally include wherein receiving the user feedback data comprises monitoring for an utterance from the passenger that indicates the issue, the utterance being analyzed by a natural language processor to identify the issue.

In example 6, the subject matter of any of examples 1-5 can optionally include determining whether to trigger the mitigation action based on a corresponding threshold.

In example 7, the subject matter of any of examples 1-6 can optionally include wherein triggering the mitigation action to occur comprises rerouting the aerial vehicle, causing a change in a speed of the aerial vehicle, or causing a change in an altitude of the aerial vehicle.

In example 8, the subject matter of any of examples 1-7 can optionally include wherein triggering the mitigation action to occur comprises rerouting future aerial vehicles to avoid the issue or changing an aerial vehicle type operating on a same route as the aerial vehicle.

In example 9, the subject matter of any of examples 1-8 can optionally include wherein the identifying comprises detecting a timestamp associated with the user feedback data; and identifying a portion of a route where the issue occurred by correlating the timestamp with route data.

In example 10, the subject matter of any of examples 1-9 can optionally include wherein the correlating the user feedback data with other data associated with the flight comprises correlating the user feedback data with one or more of vehicle flight data, route data, third-party data, and known data, the known data comprising known conditions corresponding to root causes of issues.

In example 11, the subject matter of any of examples 1-10 can optionally include using machine-learning to construct the known data.

In example 12, the subject matter of any of examples 1-11 can optionally include wherein the identifying comprises using a natural language processor to identify an utterance corresponding to the issue.

Example 13 is a system for improving aerial ride quality based on user feedback. The system includes one or more processors and a memory storing instructions that, when executed by the one or more hardware processors, causes the one or more hardware processors to perform operations comprising receiving, by a network system from one or more devices associated with a passenger on an aerial vehicle, user feedback data regarding a flight, the user feedback data being associated with an issue experienced by the passenger; identifying, by the network system, a root cause of the issue experienced by the passenger on the aerial vehicle, the identifying including correlating the user feedback data with other data associated with the flight; determining, by the network system, a mitigation action to mitigate the issue; and triggering, by the network system, the mitigation action to occur.

In example 14, the subject matter of example 13 can optionally include wherein receiving the user feedback data comprises receiving sensor measurements from the one or more devices associated with the passenger, the sensor measurements indicating a weight distribution and any pressure caused by passenger movement.

In example 15, the subject matter of any of examples 13-14 can optionally include wherein receiving the user feedback data comprises receiving a sensor input from the one or more devices associated with the passenger, the sensor input indicating touch by the passenger.

In example 16, the subject matter of any of examples 13-15 can optionally include wherein receiving the user feedback data comprises monitoring for an utterance from the passenger that indicates the issue, the utterance being analyzed by a natural language processor to identify the issue.

In example 17, the subject matter of any of examples 13-16 can optionally include wherein the identifying comprises detecting a timestamp associated with the user feedback data; and identifying a portion of a route where the issue occurred by correlating the timestamp with route data.

In example 18, the subject matter of any of examples 13-17 can optionally include wherein the correlating the user feedback data with other data associated with the flight comprises correlating the user feedback data with one or more of vehicle flight data, route data, third-party data, and known data, the known data comprising known conditions corresponding to root causes of issues.

In example 19, the subject matter of any of examples 13-18 can optionally include using machine-learning to construct the known data.

Example 20 is a machine-storage medium storing instructions for improving aerial ride quality based on user feedback. The machine-storage medium configures one or more processors to perform operations comprising receiving, by a network system from one or more devices associated with a passenger on an aerial vehicle, user feedback data regarding a flight, the user feedback data being associated with an issue experienced by the passenger; identifying, by the network system, a root cause of the issue experienced by the passenger on the aerial vehicle, the identifying including correlating the user feedback data with other data associated with the flight; determining, by the network system, a mitigation action to mitigate the issue; and triggering, by the network system, the mitigation action to occur Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   accessing, by a network system from one or more devices associated with a passenger on an aircraft, user feedback data regarding a flight, the user feedback data being associated with an issue experienced by the passenger while on the flight;
   computing, by the network system, a root cause of the issue experienced by the passenger on the aircraft, the computing including correlating the user feedback data with other data associated with the flight;
   computing, by the network system, a plurality of mitigation actions to mitigate the issue;
   computing, by the network system, a ranking of the plurality of mitigation actions based on an impact of each of the mitigation actions, wherein:
      the impact is associated with (i) a noise level of the flight or (ii) an amount of power usage associated with each of the mitigation actions; and
      the ranking filters the plurality of mitigation actions based on the impact of each of the mitigation actions; and
   triggering, by the network system, at least one mitigation action of the plurality of mitigation actions to occur based on the ranking of the plurality of mitigation actions.

2. The method of claim 1, wherein accessing the user feedback data occurs while the passenger is inflight.

3. The method of claim 1, wherein accessing the user feedback data comprises receiving sensor measurements from the one or more devices associated with the passenger, the sensor measurements indicating a weight distribution and any pressure caused by passenger movement.

4. The method of claim 1, wherein accessing the user feedback data comprises receiving a sensor input from the one or more devices associated with the passenger, the sensor input indicating touch by the passenger.

5. The method of claim 1, wherein accessing the user feedback data comprises monitoring for an utterance from the passenger that indicates the issue, the utterance being analyzed by a natural language processor to identify the issue.

6. The method of claim 1, further comprising determining whether to trigger the at least one mitigation action based on a corresponding threshold.

7. The method of claim 1, wherein triggering the at least one mitigation action to occur comprises rerouting the aircraft, causing a change in a speed of the aircraft, maneuvering the aircraft differently, or causing a change in an altitude of the aircraft.

8. The method of claim 1, wherein triggering the at least one mitigation action to occur comprises rerouting future aircrafts operating on a same route as the aircraft or changing an aircraft type for future aircraft operating on the same route as the aircraft to avoid the issue.

9. The method of claim 1, wherein computing the root cause comprises:
   detecting a timestamp associated with the user feedback data; and
   identifying a portion of a route where the issue occurred by correlating the timestamp with route data.

10. The method of claim 1, wherein correlating the user feedback data with other data associated with the flight comprises correlating the user feedback data with one or more of vehicle flight data, route data, third-party data, and known data, the known data comprising known conditions corresponding to root causes of issues.

11. The method of claim 10, further comprising using machine-learning to construct the known data.

12. The method of claim 1, wherein computing the root cause comprises using a natural language processor to identify an utterance corresponding to the issue.

13. A system comprising:
   one or more hardware processors; and
   a memory storing instructions that, when executed by the one or more hardware processors, cause the one or more hardware processors to perform operations comprising:
      accessing, from one or more devices associated with a passenger on an aircraft, user feedback data regarding a flight, the user feedback data being associated with an issue experienced by the passenger;
      computing a root cause of the issue experienced by the passenger on the aircraft, the computing including correlating the user feedback data with other data associated with the flight;
      computing a plurality of mitigation actions to mitigate the issue;
      computing a ranking of the plurality of mitigation actions based on an impact of each of the mitigation actions, wherein:
         the impact is associated with (i) a noise level of the flight or (ii) an amount of power usage associated with each of the mitigation actions; and
         the ranking filters the plurality of mitigation actions based on the impact of each of the mitigation actions; and
      triggering at least one mitigation action of the plurality of mitigation actions to occur based on the ranking of the plurality of mitigation actions.

14. The system of claim 13, wherein accessing the user feedback data comprises receiving sensor measurements from the one or more devices associated with the passenger, the sensor measurements indicating a weight distribution and any pressure caused by passenger movement.

15. The system of claim 13, wherein accessing the user feedback data comprises receiving a sensor input from the one or more devices associated with the passenger, the sensor input indicating touch by the passenger.

16. The system of claim 13, wherein accessing the user feedback data comprises monitoring for an utterance from the passenger that indicates the issue, the utterance being analyzed by a natural language processor to identify the issue.

17. The system of claim 13, wherein computing the root cause comprises:
   detecting a timestamp associated with the user feedback data; and
   identifying a portion of a route where the issue occurred by correlating the timestamp data with route data.

18. The system of claim 13, wherein correlating the user feedback data with other data associated with the flight comprises correlating the user feedback data with one or more of vehicle flight data, route data, third-party data, and known data, the known data comprising known conditions corresponding to root causes of issues.

19. The system of claim 18, further comprising using machine-learning to construct the known data.

20. A machine-storage medium storing instructions that, when executed by one or more processors of a machine, cause the machine to perform operations comprising:
   accessing from one or more devices associated with a passenger on an aircraft, user feedback data regarding a flight, the user feedback data being associated with an issue experienced by the passenger;
   computing a root cause of the issue experienced by the passenger on the aircraft, the computing including correlating the user feedback data with other data associated with the flight;
   computing a plurality of mitigation actions to mitigate the issue;
   computing a ranking of the plurality of mitigation actions based on an impact of each of the mitigation actions, wherein:
      the impact is associated with (i) a noise level of the flight or (ii) an amount of power usage associated with each of the mitigation actions; and
      the ranking filters the plurality of mitigation actions based on the impact of each of the mitigation actions; and
   triggering at least one mitigation action of the plurality of mitigation actions to occur based on the ranking of the plurality of mitigation actions.

21. The method of claim 1, wherein the at least one mitigation action comprises changing a skylane in which the aircraft is traveling.

* * * * *